US005855989A

United States Patent [19]

Mantegazza

[11] Patent Number: 5,855,989

[45] Date of Patent: Jan. 5, 1999

[54] DOCUMENT WITH ANTI-FORGERY AND ANTI-FALSIFICATION MEANS

[76] Inventor: Walter Mantegazza, Via Trebazio, 1-20145, Milan, Italy

[21] Appl. No.: 773,994

[22] Filed: Dec. 26, 1996

[30] Foreign Application Priority Data

Dec. 27, 1995 [IT] Italy .................................. MI95A2767

[51] Int. Cl.[6] .......................................... B32B 9/00

[52] U.S. Cl. ....................... 428/195; 428/204; 428/411.1; 428/913; 428/914; 283/72; 283/74; 283/91

[58] Field of Search ................................ 428/195, 411.1, 428/913, 914, 204, 192; 283/72, 74, 91, 58, 100, 93, 901, 113, 109

[56] References Cited

U.S. PATENT DOCUMENTS

| | | | |
|---|---|---|---|
| 5,093,184 | 3/1992 | Edwards | 428/195 |
| 5,438,403 | 8/1995 | Hoshino et al. | 356/71 |
| 5,583,631 | 12/1996 | Lazzerni | 356/71 |
| 5,678,863 | 10/1997 | Knight et al. | 283/113 |
| 5,704,651 | 1/1998 | Phillips | 283/93 |
| 5,762,378 | 6/1998 | Phillips | 283/72 |
| 5,772,248 | 6/1998 | Phillips | 285/91 |

FOREIGN PATENT DOCUMENTS

| | | |
|---|---|---|
| 388090 | 9/1990 | European Pat. Off. . |
| 628408 | 12/1994 | European Pat. Off. . |
| 2282563 | 4/1995 | United Kingdom . |

*Primary Examiner*—William Krynski
*Assistant Examiner*—Abraham Bahta
*Attorney, Agent, or Firm*—Guido Modiano; Albert Josif

[57] ABSTRACT

The present invention relates to a document with counterfeit- and forgery-preventing means particularly for valued papers and the like, which comprise a sheet-like element having, on at least one face, a graphic marking that is visible in reflected light. The particularity of the invention resides in the fact that it comprises at least one variation in the thickness of said sheet-like element which provides a graphic representation that can be viewed against the light and is complementary with respect to the at least one graphic marking.

18 Claims, 4 Drawing Sheets

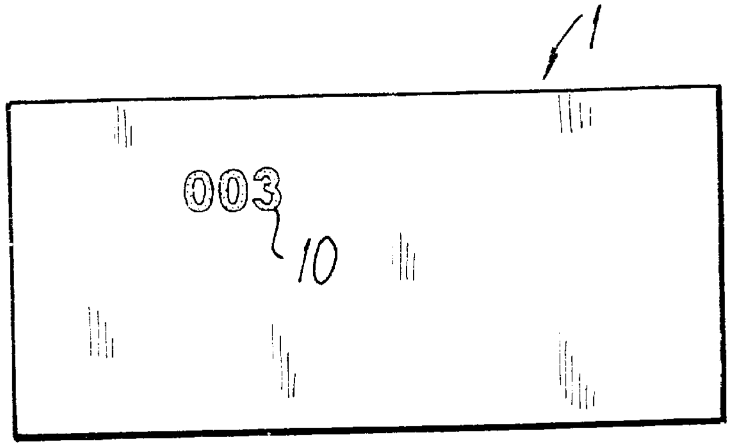
Fig. 13
Fig. 14
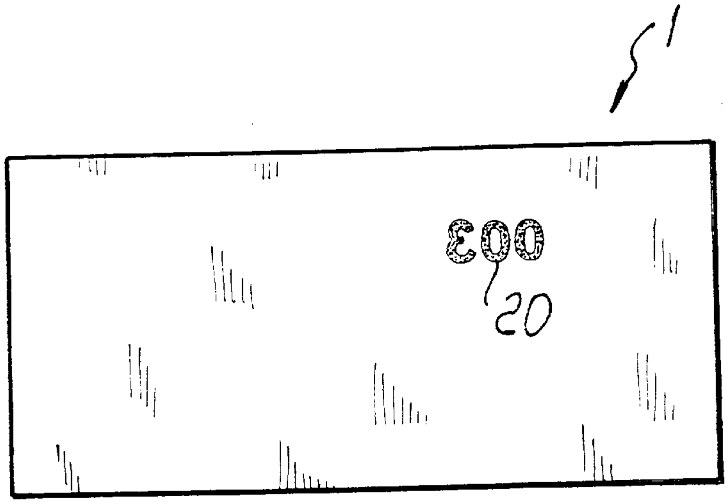
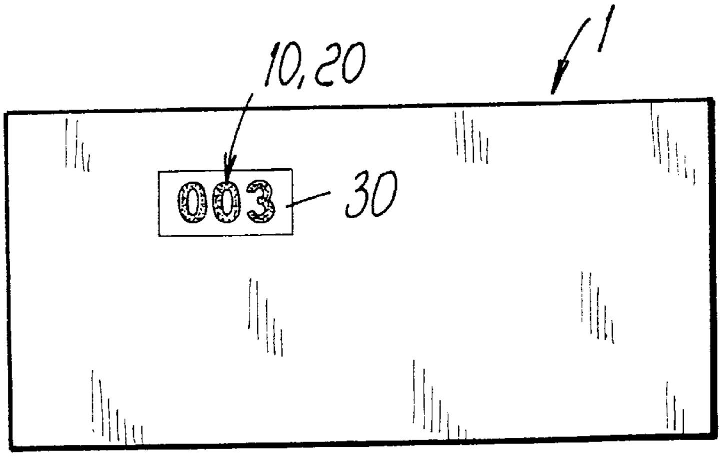
Fig. 15

DOCUMENT WITH ANTI-FORGERY AND ANTI-FALSIFICATION MEANS

BACKGROUND OF THE INVENTION

The present invention relates to a document with counterfeit- and forgery-preventing means particularly for valued papers and the like.

It is known that one problem currently strongly felt relates to the prevention of counterfeiting of documents such as valued papers, checks, currency bills, and the like, and to their forgery, as typically occurs with checks.

Various methods that attempt to make it increasingly difficult to counterfeit a document have already been devised, such as, for example, the application of graphic markings on the front of a document and the application on the back of the document of additional graphic markings which are visible in reflected light.

The particularity resides in the fact that if the document is viewed against the light, a complementary relationship is produced between the graphic markings applied to the two sides of the document, so that the resulting image can, for example, complete a design or can in any case have a configuration that is different from the configuration of the individual sides.

Various systems are currently known which are provided by printing on two sides split images which are combined again if they are viewed against the light.

This system, however, can now be easily reproduced with current technologies, since it is sufficient to photocopy the produced markings in perfect register, thus achieving a forgery that is able to overcome the above-mentioned forgery-preventing means.

SUMMARY OF THE INVENTION

The aim of the invention is to solve the above-described problem by providing a document with counterfeit- and forgery-preventing means that arise in practice from a further combination of elements which makes forgery by simple photocopying substantially impossible, thus providing a considerably higher security degree than the prior art.

Within the scope of this aim, a particular object of the invention is to provide a document in which the counterfeit-preventing means can also be forgery-preventing means, further increasing reliability regarding the authenticity of the document.

Another object of the present invention is to provide a document with counterfeit- and forgery-preventing means particularly for valued papers and the like which by virtue of its particular production characteristics is capable of giving the greatest assurances of reliability and safety in use.

Another object of the present invention is to provide a document that can be produced with per se known technologies and is furthermore competitive from a merely economical point of view.

This aim, these objects, and others which will become apparent hereinafter are achieved by a document with counterfeit- and forgery-preventing means particularly for valued papers and the like, according to the invention, which comprises a sheet-like element having, on at least one face, at least one graphic marking that is visible in reflected light, characterized in that it comprises at least a variation in the thickness of said sheet-like element which provides a graphic representation that can be viewed against the light and is complementary with respect to said at least one graphic marking.

BRIEF DESCRIPTION OF THE DRAWINGS

Further characteristics and advantages will become apparent from the description of a preferred but not exclusive embodiment of a document with counterfeit- and forgery-preventing means, illustrated only by way of non-limitative example in the accompanying drawings, wherein:

FIG. 13 is a view of a document with graphic markings visible in reflected light on the front;

FIG. 14 is a view of the document with graphic markings, in register and visible in reflected light, provided on the back;

FIG. 15 is a view of the thickness variation in the region where the graphic markings are provided.

DESCRIPTION OF THE PREFERRED EMBODIMENTS

With reference to the above figures, the document with counterfeit- and forgery-preventing means particularly for valued papers and the like, according to the invention, comprises a sheet-like element 1 which is advantageously formed by paper-like material of the type commonly used for valued papers, currency bills, checks, or the like. The element 1 is sheet-like in that its thickness (see for example FIG. 2) is relatively thin, with respect to its relatively broad expansion (see for example FIG. 1).

Figure 1:
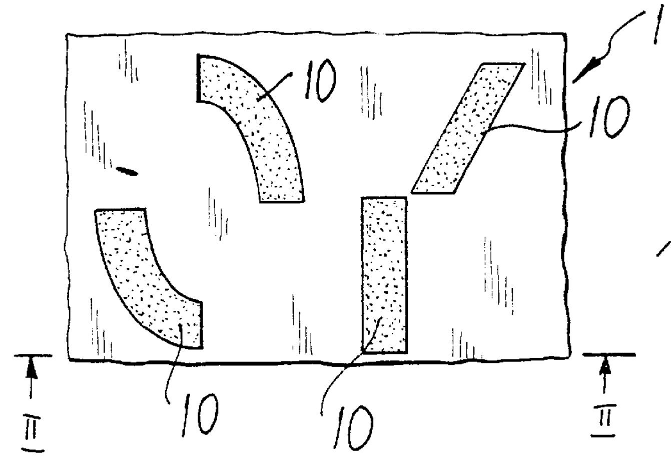
FIG. 1 is a schematic view of a portion of a document, illustrating the graphic markings provided on the front.
Figure 2:
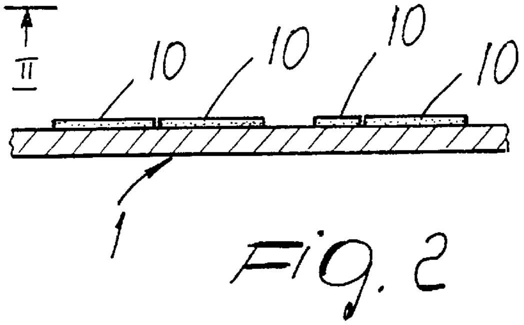
FIG. 2 is a schematic sectional view, taken along the plane II—II of FIG. 1.

The particularity of the invention resides in the fact that on the front of the element 1, as shown in FIG. 1, there are provided first graphic markings, designated by the reference numeral 10, which are provided by printing and are easily visible in reflected light.

Figure 3:
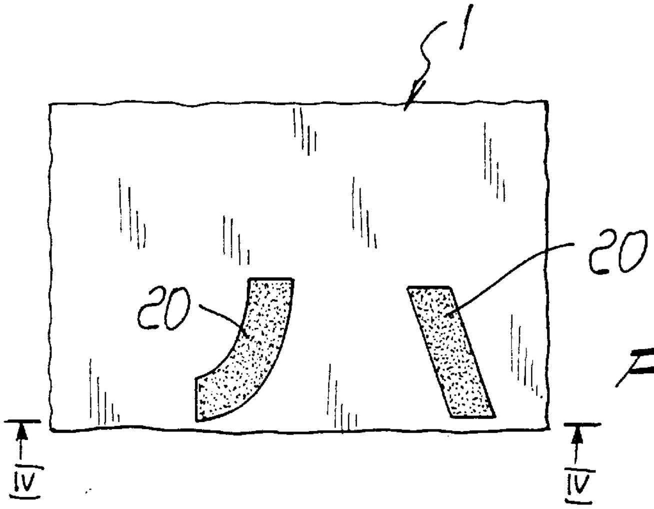
FIG. 3 is a schematic view of a portion of the back of the document, illustrating the graphic markings provided thereon.
Figure 4:
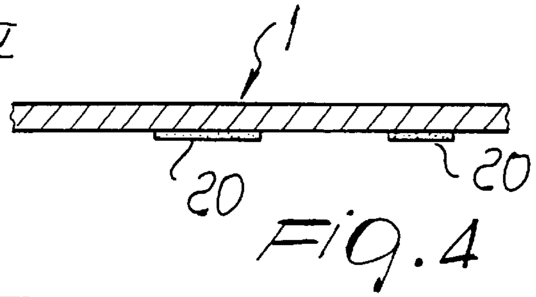
FIG. 4 is a sectional view, taken along the plane IV—IV of FIG. 3.
Figure 5:
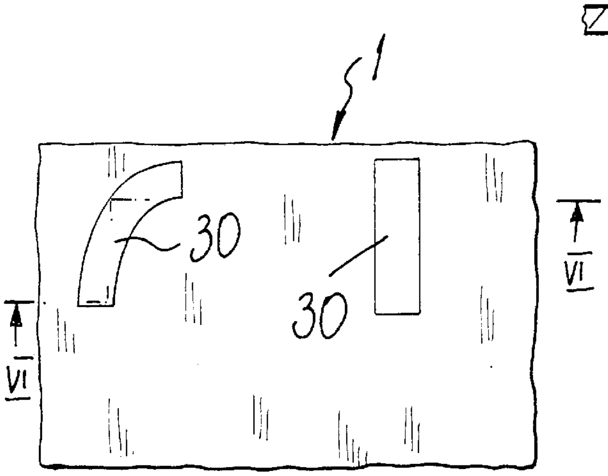
FIG. 5 is a schematic view of the graphic representation obtained by means of a thickness variation that is visible against the light.

On the back of the document constituted by the sheet-like element 1, as shown in FIG. 3, the second graphic markings 20 are provided, which are also visible in reflected light and are preferably but not necessarily different from the markings 10.

Figure 6:
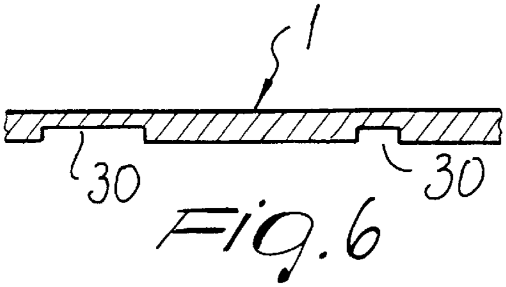
FIG. 6 is a sectional view, taken along the multiple planes VI—VI of FIG. 5.
Figure 7:
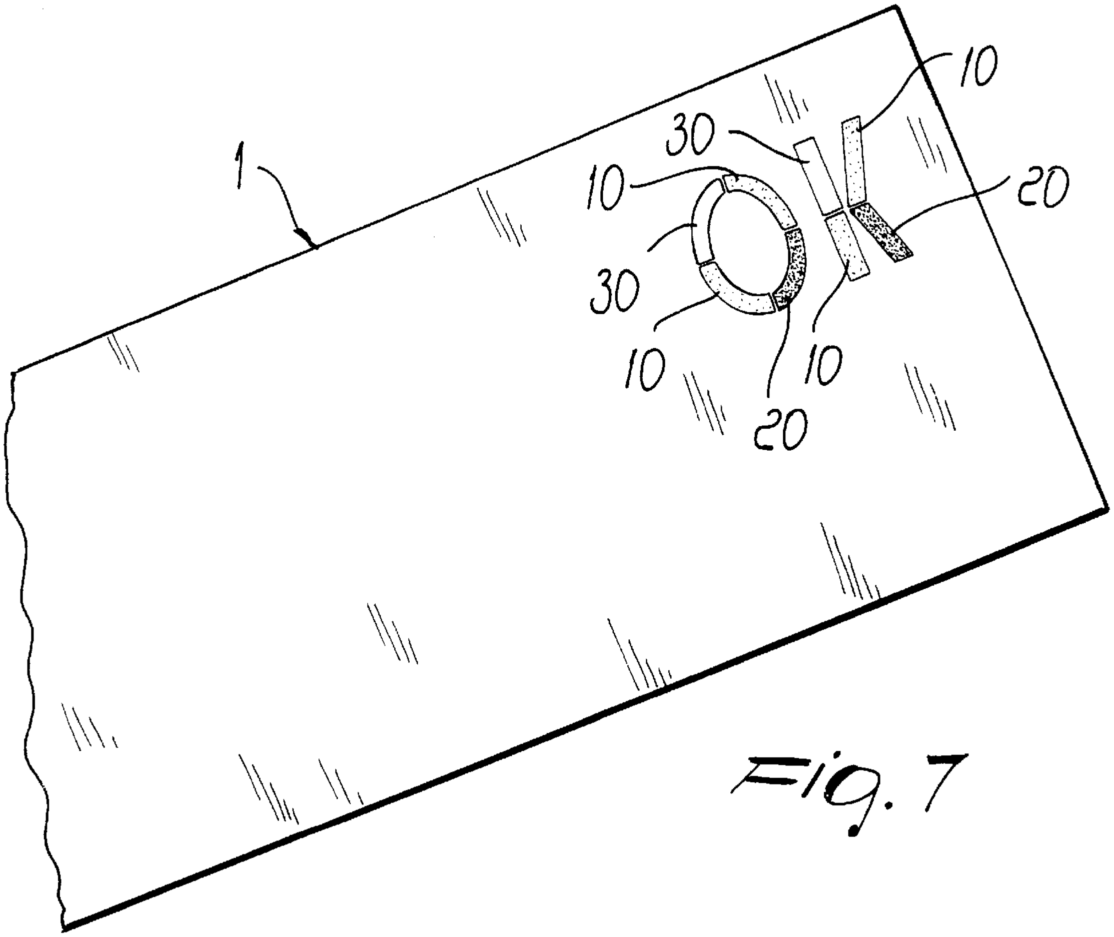
FIG. 7 is a schematic view of the document viewed against the light.
Figure 8:
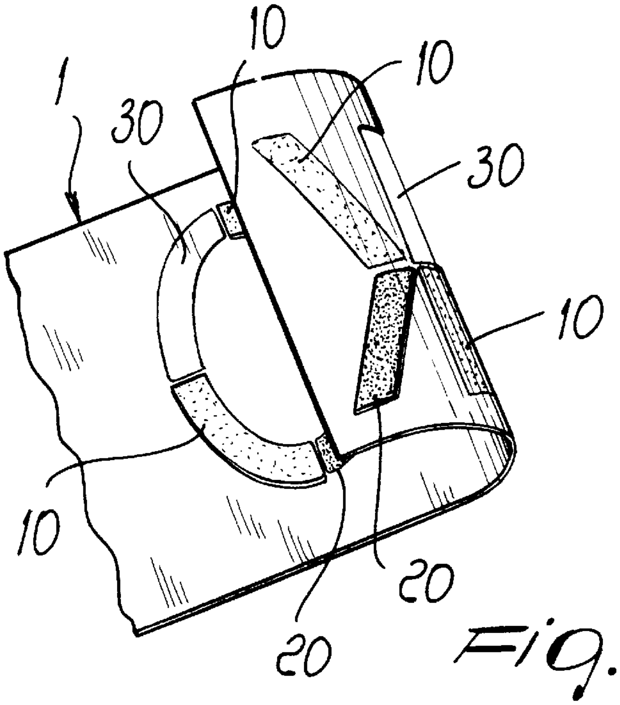
FIG. 8 is a schematic perspective view of the synergic combination of the forgery-preventing means.

The important characteristic of the invention is constituted by the fact that the above-described graphic markings visible in reflected light are combined with graphic representations obtained by means of a variation 30, typically constituted by a reduction in the thickness of the sheet-like element (thickness reduction). FIG. 6 illustrates the cross-sectional view of the sheet-like element 1 in which the thickness variation 30 has a thickness which is reduced with respect to the thickness of the remaining part of the sheet-like element arranged adjacent the thickness variation 30.

The thickness reduction is poorly visible in reflected light, but against the light the three elements, i.e., the graphic markings which are visible in reflected light and are provided on the back and on the front, and the reduction in thickness, combine with each other since they are complementary, forming an overall image.

By using the same criterion, it is also possible to use the thickness variation, preferably the thickness reduction, to provide a graphic representation which shows, in reflected light, an image that is different from the image that is visible against the light.

Thus, for example, the thickness reduction provided by means of stippled portions appears, in reflected light, with dots as a dark element, whilst the dots become a light-colored element when viewed against the light.

This aspect is important because it makes it impossible to photocopy the document, since if it is photocopied the image does not vary in reflected light and against the light.

Another possible solution entails the provision of two different regions where the thickness of the sheet-like element varies, which provide two different images that are visible in reflected light, respectively on the front and on the back of the sheet-like element 1, but fuse into a single image if the document is viewed against the light.

The thickness reduction thus becomes a further security element which, added to one or more elements printed in one or more colors, contributes to the obtainment of images that are entirely different when viewed in reflected light if compared with the same images viewed against the light.

The reduction in the thickness of the paper can also allow to recognize the document by touch, simulate a watermark effect, provide perfect register between cooperating elements, at least one whereof is provided with the thickness-reduction method, making forgery extremely difficult.

It should in fact be noted that in the regions where the thickness is reduced it is extremely difficult to perform forgery, since removal of material in a region that already has an intrinsically reduced thickness can produce an actual hole, making the document entirely useless.

Figure 9:
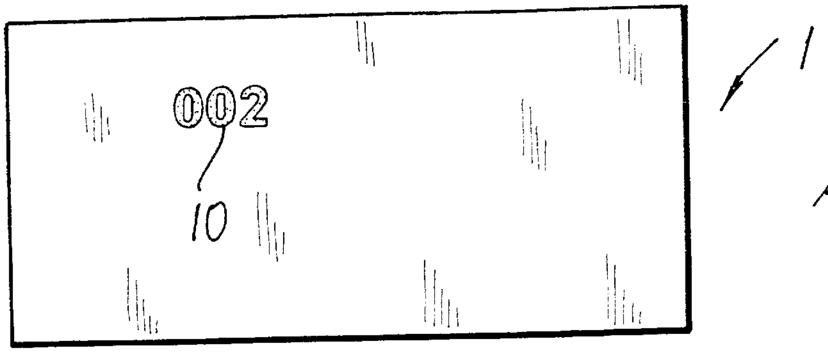
FIG. 9 is a view of a document with graphic markings constituted by numerals which can be seen in reflected light on the front.
Figure 10:
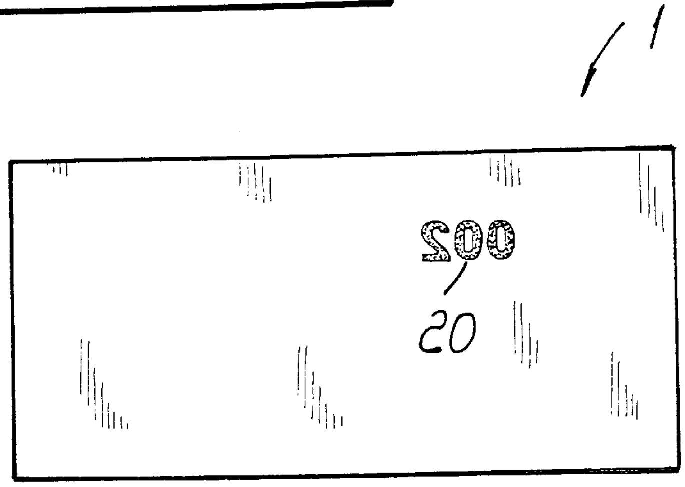
FIG. 10 is a view of the same document, provided on the back with the same numeric markings in mirror-symmetrical form and in register and likewise visible in reflected light.
Figure 11:
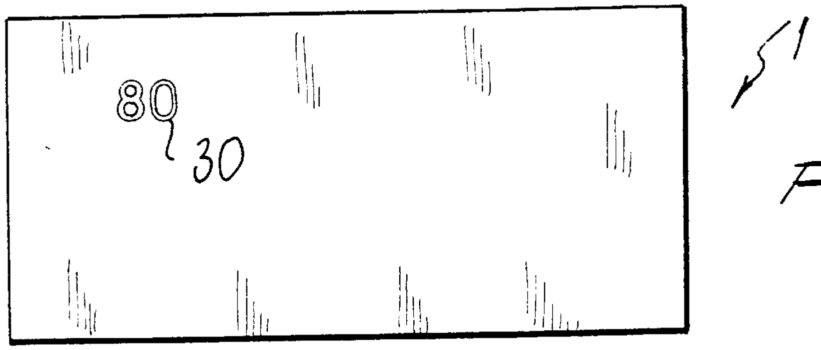
FIG. 11 is a view of a graphic representation obtained by means of a thickness variation.
Figure 12:
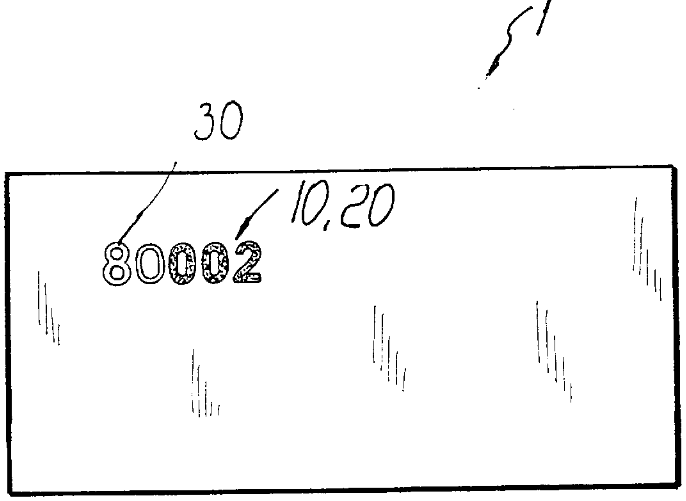
FIG. 12 is a view of the same document seen against the light, with the combination of the numeric symbols obtained by printing and by thickness variation.

In order to make counterfeiting and forgery even more difficult, it is possible to provide the graphic markings visible in reflected light on the front and on the back so that they are in register with each other and, for example, mirror-symmetrical, as shown in FIGS. 9 and 10; it is also possible to combine the printed graphic markings, constituted for example by numerals, with graphic representations obtained by thickness variation, typically thickness reduction, so as to produce numerals that are visible against the light and can be combined with the printed numerals.

According to another conceptually similar embodiment, it is possible to print graphic markings, for example numeric ones, on the front and back so that they are in register with each other in a region that has undergone a thickness variation, constituted for example by a frame that surrounds the graphic markings or by any other element, so that forgery is substantially impossible since it is not possible to erase in a reduced-thickness region.

In producing the document it is possible to use all printing methods, whether conventional or of the tracing, pigment-transmission, or transfer types and the like, whereas as regards the thickness variation and in practice the thickness reduction of the paper it is possible to use routing machines and/or laser beams and/or chemical systems.

It should also be noted that it is possible to provide the thickness variation in combination with mechanical and electronic numbering devices, since it is possible for example to provide a decimal number on one side of the document and provide, in perfect register therewith, on the opposite side, a reduction in the thickness of the paper that has the same size as the printed number, making document counterfeiting substantially impossible.

From the above description it is thus evident that the invention achieves the intended aim and objects and in particular the fact is stressed that combining the paper thickness reduction with other per se known forgery-preventing and counterfeit-preventing means, such as for example the printing of complementary images, leads to a significant increase in counterfeit-preventing security criteria.

The above-described method also allows to provide a very wide range of combinations of elements that make it practically impossible to forge or counterfeit the document.

The invention thus conceived is susceptible of numerous modifications and variations, all of which are within the scope of the inventive concept.

All the details may furthermore be replaced with other technically equivalent elements.

In practice, the materials employed, as well as the contingent shapes and dimensions, may be any according to the requirements.

What is claimed is:

1. A document with counterfeit-preventing and forgery-preventing means comprising a sheet element having, on at least one face, at least one graphic marking that is visible in reflected light, said document comprising at least one region of said sheet element which has a thickness which is different than the thickness of the part of said sheet element arranged adjacent to said at least one region such that said at least one region provides a graphic representation that can be viewed against the light and is complementary with respect to said at least one graphic marking.

2. A document according to claim 1, comprising at least one graphic marking that is visible in reflected light and is provided on the front of said sheet element, and at least one graphic marking which is visible in reflected light is provided on the back of said sheet element, said at least one region providing said graphic representation which is poorly visible in reflected light, said graphic markings combining with said at least one graphic representation when viewed against the light to form an overall image.

3. A document according to claim 1, wherein said at least one region has a thickness which is less than the thickness of the part of said sheet element arranged adjacent to said at least one region.

4. A document with counterfeit-preventing and forgery-preventing means comprising a sheet element, wherein said document comprises at least one region of said sheet element which has a thickness which is different than the thickness of the part of said sheet element arranged adjacent to said at least one region such that said at least one region provides a graphic representation that forms, in reflected light, an image that is different from the image of said graphic representation viewed against the light.

5. A document according to claim 4, comprising at least one graphic marking that is visible in reflected light and is provided on the front of said sheet element, and at least one graphic marking which is visible in reflected light and is provided on the back of said sheet element, said graphic markings combining with said at least one graphic representation when viewed to form an overall image.

6. A document according to claim 4, wherein said at least one region has a thickness which is less than the thickness of the part of said sheet element arranged adjacent to said at least one region.

7. A document with counterfeit-preventing and forgery-preventing means comprising a sheet element, wherein said document has at least one first region of said sheet element which has a thickness which is different than the thickness of the part of said sheet element arranged adjacent to said at least one first region and at least one second region of said sheet element which has a thickness which is different than the thickness of the part of said sheet element arranged adjacent to said at least one second region, said first and second regions providing a first image and a second image which are visible in reflected light on the front and on the back of said sheet element respectively, said first and second images being complementary to each other when viewed against the light.

8. A document according to claim 7, comprising at least one graphic marking that is visible in reflected light and is provided on the front of said sheet element, and at least one graphic marking which is visible in reflected light and is provided on the back of said sheet element, said graphic markings combining with said first and second regions when viewed to form an overall image.

9. A document according to claim 7, wherein said at least one region has a thickness which is less than the thickness of the part of said sheet element arranged adjacent to said at least one region.

10. A document with counterfeit-preventing and forgery-preventing means comprising a sheet element having, on at least one face, at least one graphic marking which is visible in reflected light, wherein said document comprises at least one region of said sheet element which has a thickness which is different than the thickness of the part of said sheet element arranged adjacent to said at least one region such that said at least one region provides a graphic representation that can be seen against the light and is in register with said at least one graphic marking.

11. A document according to claim 10, comprising at least one graphic marking that is visible in reflected light and is provided on the front of said sheet element, and at least one graphic marking which is visible in reflected light and is provided on the back of said sheet element, said graphic markings combining with said at least one graphic representation when viewed against the light to form an overall image.

12. A document according to claim 10, wherein said at least one region has a thickness which is less than the thickness of the part of said sheet element arranged adjacent to said at least one region.

13. A document with counterfeit-preventing and forgery-preventing means comprising a sheet element, wherein said document has at least one graphic marking which is visible in reflected light on at least one side of said sheet element and is provided in a region of said sheet element, which has a thickness which is different than the thickness of the part of said sheet element arranged adjacent to said region.

14. A document according to claim 13, comprising at least one graphic marking that is visible in reflected light and is provided on the front of said sheet element, and at least one graphic marking which is visible in reflected light and is provided on the back of said sheet element, said graphic markings combining when viewed to form an overall image.

15. A document according to claim 13, wherein said region has a thickness which is less than the thickness of the part of said sheet element arranged adjacent to said region.

16. A document with counterfeit-preventing and forgery-preventing means comprising a sheet element, wherein said document comprises at least one graphic marking on one side of the sheet element and, on the other side of the sheet element, at least one graphic marking which is mirror-symmetrical and in register with the graphic marking formed on the one side, said graphic markings being provided in a region wherein the thickness of said sheet element is different than the thickness of the part of said sheet element arranged adjacent said region.

17. A document according to claim 16, comprising at least one graphic marking that is visible in reflected light and is provided on the front of said sheet element, and at least one graphic marking which is visible in reflected light and is provided on the back of said sheet element, said graphic markings combining when viewed to form an overall image.

18. A document according to claim 16, wherein said region has a thickness which is less than the thickness of the part of said sheet element arranged adjacent to said region.

* * * * *